(12) United States Patent
Fan et al.

(10) Patent No.: US 10,405,248 B2
(45) Date of Patent: Sep. 3, 2019

(54) METHOD, DEVICE AND COMPUTER PROGRAM FOR PRIMARY CELL CHANGE

(71) Applicant: Telefonaktiebolaget LM Ericsson (publ), Stockholm (SE)

(72) Inventors: Rui Fan, Beijing (CN); Mårten Ericson, Luleå (SE); Caner Kilinc, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 84 days.

(21) Appl. No.: 15/515,596

(22) PCT Filed: Aug. 3, 2016

(86) PCT No.: PCT/CN2016/093070
§ 371 (c)(1),
(2) Date: Mar. 29, 2017

(87) PCT Pub. No.: WO2018/023494
PCT Pub. Date: Feb. 8, 2018

(65) Prior Publication Data
US 2018/0352487 A1 Dec. 6, 2018

(51) Int. Cl.
*H04W 36/00* (2009.01)
*H04W 12/04* (2009.01)
(Continued)

(52) U.S. Cl.
CPC ....... *H04W 36/0083* (2013.01); *H04W 12/04* (2013.01); *H04W 36/00* (2013.01);
(Continued)

(58) Field of Classification Search
CPC ................................................ H04W 36/0083
See application file for complete search history.

(56) References Cited

U.S. PATENT DOCUMENTS

| 2012/0044812 A1 | 2/2012 | Hiddink et al. |
| 2012/0243514 A1* | 9/2012 | Wu ................... H04W 56/0045 370/336 |

(Continued)

FOREIGN PATENT DOCUMENTS

| CN | 102378244 A | 3/2012 |
| WO | 2015174658 A1 | 11/2015 |
| WO | 2016042766 A1 | 3/2016 |

OTHER PUBLICATIONS

International Search Report and Written Opinion for Application No. PCT/CN2016/093070, dated Apr. 27, 2017, 9 pages.
(Continued)

*Primary Examiner* — Andrew Lai
*Assistant Examiner* — Andrew C Lee
(74) *Attorney, Agent, or Firm* — Nicholson De Vos Webster & Elliott LLP

(57) ABSTRACT

Embodiments of the disclosure generally relate to primary cell change. A network device detects whether layer 2 context being kept and/or one or more serving secondary cells remain for a primary cell change for a terminal device. Then, the network device configures a message indicating the primary cell change based on the detecting and transmits the message to the terminal device. The time period of primary cell change can be reduced efficiently and the data transmission during the primary cell change can be optimized.

15 Claims, 7 Drawing Sheets

(51) Int. Cl.
*H04W 74/08* (2009.01)
*H04W 36/08* (2009.01)

(52) U.S. Cl.
CPC .... *H04W 36/0011* (2013.01); *H04W 36/0038* (2013.01); *H04W 74/0833* (2013.01); *H04W 36/0069* (2018.08); *H04W 36/08* (2013.01)

(56) References Cited

U.S. PATENT DOCUMENTS

| | | | |
|---|---|---|---|
| 2012/0327797 A1 | 12/2012 | Siomina et al. | |
| 2013/0039294 A1* | 2/2013 | Wang | H04W 74/04 370/329 |
| 2013/0170462 A1* | 7/2013 | Seo | H04L 5/0053 370/329 |
| 2014/0112308 A1* | 4/2014 | Kwon | H04W 56/0005 370/331 |
| 2014/0192771 A1* | 7/2014 | Jung | H04W 36/0083 370/331 |
| 2014/0293887 A1* | 10/2014 | Kumar | H04W 74/0833 370/329 |
| 2015/0319801 A1* | 11/2015 | Lee | H04W 56/00 370/329 |
| 2015/0358813 A1* | 12/2015 | Lee | H04W 12/04 380/279 |
| 2016/0374026 A1* | 12/2016 | Dinan | H04W 52/146 |

OTHER PUBLICATIONS

"LTE; Evolved Universal Terrestrial Radio Access (E-UTRA) and Evolved Universal Terrestrial Radio Access Network (E-UTRAN); Overall description; Stage 2 (3GPP TS 36.300 version 10.5.0 Release 10)", ETSI TS 136 300 v10.5.0, (Nov. 2011), 208 pages.

Invitation pursuant to Rule 62a(1) EPC and Rule 63(1) EPC for Application No. 16886806.5, dated Jan. 3, 2019, 3 pages.

International Preliminary Report on Patentability for Application No. PCT/CN2016/093070, dated Nov. 8, 2018, 35 pages.

Extended European Search Report for Application No. EP16886806.5, dated Jun. 14, 2019, 14 pages.

LG Electronics Inc., 3GPP TSG-RAN WG3 Meeting #87bis "TP for Reference to the UE Context in the SeNB with the SeNB UE X2AP ID or More Information," R3-150899, Apr. 20-24, 2015, 7 pages.

* cited by examiner

400

```
┌─────────────────────────────────────┐
│ RECEIVE A MESSAGE TRANSMITTED FROM A│
│    NETWORK DEVICE, THE MESSAGE BEING│     410
│ CONFIGURED BY DETECTING WHETHER LAYER 2│
│ CONTEXT BEING KEPT AND/ OR ONE OR MORE│
│  SERVING SECONDARY CELLS REMAIN FOR A │
│   PRIMARY CELL CHANGE FOR THE TERMINAL│
│                DEVICE                 │
└─────────────────────────────────────┘
                    │
                    ▼
┌─────────────────────────────────────┐
│   OBTAIN INFORMATION OF THE PRIMARY CELL│  420
│    CHANGE FROM THE RECEIVED MESSAGE   │
└─────────────────────────────────────┘
                    │
                    ▼
┌─────────────────────────────────────┐
│  PERFORM THE PRIMARY CELL CHANGE BASED ON│ 430
│              THE INFORMATION          │
└─────────────────────────────────────┘
```

FIG. 4

METHOD, DEVICE AND COMPUTER PROGRAM FOR PRIMARY CELL CHANGE

CROSS-REFERENCE TO RELATED APPLICATIONS

This application is a National stage of International Application No. PCT/CN2016/093070, filed Aug. 3, 2016, which is hereby incorporated by reference.

TECHNICAL FIELD

The non-limiting and example embodiments of the present disclosure generally relate to a technical field of wireless communications, and specifically to a method, device and computer program for primary cell change in a wireless communications system and related communication device.

BACKGROUND

This section introduces aspects that may facilitate a better understanding of the disclosure. Accordingly, the statements of this section are to be read in this light and are not to be understood as admissions about what is in the prior art or what is not in the prior art.

Wireless communication systems are advancing to provide good service quality, support a high data rate and keep up with the continuously increasing demand for wireless data traffic.

Multi-carrier system is a technique available for increasing the bandwidth available for communication by employing simultaneously more than one carrier for communication by a single communication device. A multi-carrier system uses more than one carrier in the downlink and/or the uplink.

For bandwidth extension, carrier aggregation (CA) was introduced to the LTE-A system and it was firstly defined in 3GPP Rel-10 and by which two or more component carriers are aggregated to achieve a wider-band transmission. An LTE-A specification supports carrier aggregation for both continuous and non-continuous component carriers. The carrier aggregation increases bandwidth flexibility by aggregating the non-continuous component carriers. A component carrier is used as an UL component carrier or a downlink (DL) component carrier. Now CA is an important feature in LTE which can improve both system capacity and User Equipment (UE) performance. When the UE is configured with the carrier aggregation, the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively.

Moreover, the component carriers configured to the UE necessarily consists of one DL primary component carrier (PCC) and one UL primary component carrier. Component carriers other than the primary component carriers are named UL or DL secondary component carriers (SCCs). The numbers of UL and DL secondary component carriers are arbitrary, and are related to the UE capability and available radio resource. One of the serving cells is designated as a "primary cell". A serving cell that is not a primary cell is referred to as a secondary cell. The functions provided by the primary cell include being responsible for many control plane related events, e.g. providing the necessary information for NAS, e.g. TAI, providing input for security, determining RLF, being the reference Carrier to determine handover, being the carrier to carry PUCCH channel etc.

When the communication link between the UE and the primary cell on the PCC is interrupted, the communication between the UE and the network fails even if the communication link between the UE and a secondary cell is sustained. Given the importance of the link between the UE and the primary cell considering the functions provided by the primary cell, in order to minimize problems associated with radio link quality and other issues, it is necessary to ensure that the primary cell is the best cell of the serving cells in terms of quality. Such a requirement then makes it necessary to change the primary cell when the current primary cell is no longer the best cell in radio link quality. According to 3GPP Rel-13, primary cell can only be changed with handover procedure (i.e. with security key change and RACH procedure).

SUMMARY

The above requirement of 3GPP Rel-13 may result in some undesirable effects during primary cell change for the next generation networks. When primary cell needs to be changed, a handover procedure is needed which means RRCConnectionReconfiguration message including MobiltyControlInfo is sent to UE, which will then trigger PDCP/RLC reestablishment, MAC reset, new key derivation, and random access procedure at a new primary component carrier. Usually this procedure will take around 40 ms, and during this period, data transmission is interrupted. Moreover, in the next generation networks such as NR, due to high frequency band and beamforming used, the primary cell change could be more frequent than in LTE and such a long time period of data interruption during the primary cell change is undesirable.

In order to solve at least part of the above problems, methods, devices and computer programs are provided in the present disclosure. It can be appreciated that embodiments of the present disclosure are not limited to a wireless system operating in NR network, but could be more widely applied to any application scenario where similar problems exist.

Various embodiments of the present disclosure mainly aim at providing methods, devices and computer programs for controlling a transmission between a transmitter and a receiver, for example, in a shared frequency band. Each of the transmitter and the receiver could be, for example, a network device or a terminal device. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a network device. The method includes: detecting whether layer 2 context being kept and/or one or more serving secondary cells remain for a primary cell change for a terminal device; configuring a message indicating the primary cell change based on the detecting; and transmitting the message to the terminal device.

In one embodiment, detecting whether layer 2 context being kept for a primary cell change for a terminal device is detecting whether part or entire of the layer 2 context corresponding to a second primary cell keeps the same comparing to a first primary cell; and/or detecting one or more serving secondary cells remain for a primary cell change for a terminal device is detecting whether index of the second primary cell is same as one secondary cell of a first group of secondary cells; the terminal device is being served by the first primary cell and the first group of secondary cells, and to be severed by the second primary cell and a second group of secondary cells after the primary cell change.

In one embodiment, the method further includes: in response to it being detected that entire of layer 2 context not being kept; configuring the message by including at least security information element to require the terminal device to derive a new security key.

In one embodiment, the method further includes: in response to it being detected that entire of the layer 2 context except PDCP entity corresponding to the second primary cell not being kept comparing to the first primary cell; configuring the message by including at least information element to trigger reconfiguring of RLC/MAC entity.

In one embodiment, the method further includes: in response to it being detected that entire of layer 2 context being kept and the index of the second primary cell is not same as any secondary cell of the first group of secondary cells; configuring the message by including at least ID information of the second group of secondary cells.

In one embodiment, the method further includes: in response to it being detected that the index of the second primary cell is same as one secondary cell of the first group of secondary cells; configuring the message to include at least ID information of the second primary cell.

In one embodiment, the method further includes, wherein the MAC message is transmitted in a MAC or RRC message.

In one embodiment, the method further includes, wherein the MAC message includes a MAC control element which is identified by a Logical Channel ID.

In one embodiment, the method further includes, wherein the MAC message includes a MAC control element which indicates index of the second primary cell.

In one embodiment, the method further includes, wherein the control element is transmitted via all existing component cells controlled by the network device which continues transmitting the MAC control element until receiving a HARQ ACK from one of the component cells corresponding to this MAC control element transmission.

In a second aspect of the disclosure, there is provided a network device. The network device includes: a detecting unit configured to detect whether layer 2 context being kept and/or one or more serving secondary cells remain for a primary cell change for a terminal device; a configuration unit configured to configure a message indicating a primary cell change based on the detecting by the detecting unit; a transmitting unit configured to transmit the message to the terminal device.

In a third aspect of the disclosure, there is provided a method implemented at a mobile terminal. The method includes: receiving a message transmitted from a network device, the message being configured by detecting whether layer 2 context being kept and/or one or more serving secondary cells remain for a primary cell change for the terminal device; obtaining information of the change of primary cell from the received message; performing the primary cell change based on the information.

In one embodiment, detecting whether layer 2 context being kept for a primary cell change for the terminal device is detecting whether part or entire of layer 2 context corresponding to a second primary cell keeps the same comparing to a first primary cell; and/or detecting one or more serving secondary cells remain for a primary cell change for a terminal device is detecting whether index of the second primary cell is same as one secondary cell of a first group of secondary cells or the index (indices) of one or more of the second primary cell and secondary cells in the second group of secondary cells included in the message is the same as the first primary cell and secondary cells in the first group of secondary cells; and the terminal device is being served by the first primary cell and the first group of secondary cells, and to be severed by the second primary cell and a second group of secondary cells after the primary cell change.

In one embodiment, the method further includes: in response to it being detected that the received message includes an information element for derivation of a new security key; updating the second primary cell index according to the received message; deriving a second security key; resetting MAC; re-establishing PDCP/RLC; and initiating random access to the second primary cell.

In one embodiment, the method further includes: in response to it being detected that the received message include an information element to trigger reconfiguring of RLC/MAC; updating the second primary cell index according to the received message; resetting MAC; re-establishing RLC; and initiating random access to the second primary cell.

In one embodiment, the method further includes: in response to it being detected that the received message does not include an information element for derivation of a new security key or triggering reconfiguring of RLC/MAC while the index (indices) of one or more of the second primary cell and secondary cells in the second group of secondary cells included in the message is not the same as any of the first primary cell and secondary cells in the first group of secondary cells, updating the second primary cell index according to the received message; initiating random access to the second primary cell.

In one embodiment, in response to it being detected that the index (indices) of one or more of the second primary cell and secondary cells in the second group of secondary cells included in the message is the same as any of the first primary cell and secondary cells in the first group of secondary cells while the index of the second primary cell is not same as index of any one of the secondary cells in the first group of secondary cells; updating the second primary cell index according to the received message; initiating random access to the second primary cell; continuing data transmission and or reception on the one or more secondary cells of the first group of secondary cells whose index (indices) is the same as any one of the second primary cell or secondary cell of the second group of secondary cells between the terminal device and the network device.

In one embodiment, the method further comprises: in response to it being detected that index of the second primary cell is same as any one of the secondary cells in the first group of secondary cells; updating the second primary cell index according to the received message; continuing data transmission and or reception on the one or more secondary cells of the first group of secondary cells whose index (indices) are the same as any one secondary cell of the second group of secondary cells between the terminal device and the network device.

In a fourth aspect of the disclosure, there is provided a terminal device. The terminal device includes: a receiving unit 710 configured to receive a message transmitted from a network device, the message being configured by detecting whether layer 2 context being kept and/or one or more serving secondary cells remain for a primary cell change for the terminal device; an obtaining unit 720 configured to obtain information of the primary cell change from the received message; a performing unit 730 configured to perform the primary cell change based on the information.

In a fifth aspect of the disclosure, there is provided a network device. The network device includes: a processor and a storage medium, the storage medium containing instructions that, when executed on the processor, cause the network device to: detect whether layer 2 context being kept and/or one or more serving secondary cells remain for a primary cell change for a terminal device; configure a message indicating a primary cell change based on the detecting; transmit the message to the terminal device.

In a sixth aspect of the disclosure, there is provided a terminal device. The terminal device includes: a processor and a storage medium, the storage medium containing instructions that, when executed on the processor, cause the terminal device to: receive a message transmitted from a network device, the message being configured by detecting whether layer 2 context being kept and/or one or more serving secondary cells remain for a primary cell change for the terminal device; obtain information of the primary cell change from the received message; perform the primary cell change based on the information.

In a seventh aspect of the disclosure, there is provided a computer program. The instructions which, when executed on at least one processor, cause the at least one processor to carry out the method according to the first aspect of the disclosure.

In an eighth aspect of the disclosure, there is provided a computer program. The instructions which, when executed on at least one processor, cause the at least one processor to carry out the method according to the third aspect of the disclosure.

According to the various aspects and embodiments as mentioned above, the time period for the change of primary cell could be reduced and thus the delayed or interrupted data transmission during the primary cell change could be optimized.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 4 shows a flowchart of a method 400 at a terminal device in accordance with an embodiment of the present disclosure;

DETAILED DESCRIPTION

Figure 1:
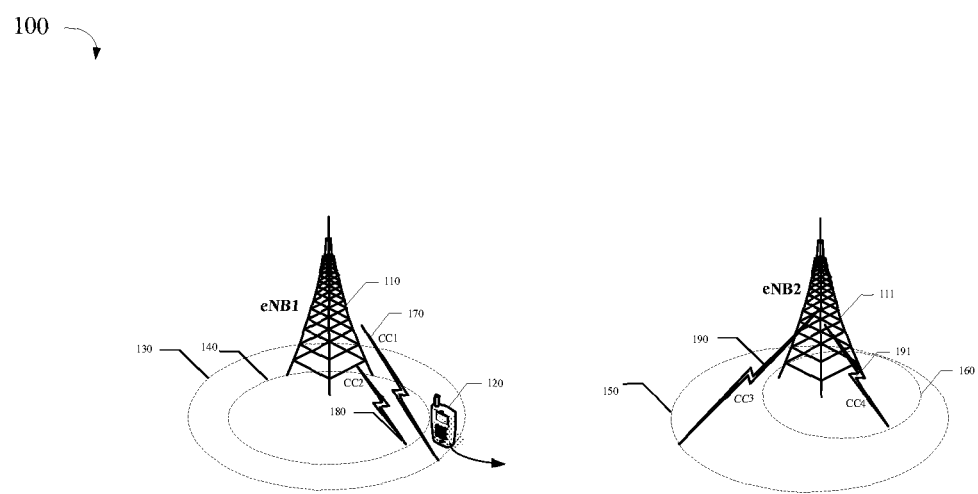
FIG. 1 shows an environment of a wireless communication network 100 in which embodiments of the present disclosure may be implemented.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, a pedestrian and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which illustrates an environment of a wireless communication network 100 in which embodiments of the present disclosure may be implemented. As shown in FIG. 1, the wireless communication network 100 includes a network device with carrier aggregation, which is implemented as a BS 110, and a terminal device 120. The BS 110 acts as a serving node of the terminal device 120. In particular, the BS 110 provides two component carriers 170 and 180, and the terminal device 120 is served by the BS 110 via the component carriers 170 and 180. Correspondingly, there are a number of serving cells for example 130 and 140, one for each component carrier such as the component carrier 170 and 180. The terminal device 120 is configured for carrier aggregation and receives from BS 110 the component carrier 170 and the component carrier 180 wherein 130 is a primary cell (Pcell) while 140 is a secondary cell (Scell). The concepts of component carrier and cell may be interchangeable in the discussion of the disclosure.

The wireless communication network 100 may follow any suitable communication standards, such as LTE-Advanced (LTE-A), LTE, Wideband Code Division Multiple Access (WCDMA), High-Speed Packet Access (HSPA), and so on. Furthermore, the communications between the terminal device 120 and the BS 110/111 in the network 100 may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

To facilitate the discussions of the disclosure, the current primary cell 130 could be referred to as the first primary cell which means the primary cell serving the terminal device 120 before the primary cell change completes. The new primary component cell could be referred to as the target primary cell or the second primary cell 150 which means the primary cell to serve the terminal device 120 after the primary cell change completes. The first primary cell 130 serves the terminal device 120 together with a first group of secondary cells 140. Correspondingly, the second primary cell 150 is to serve the terminal device 120 together with a second group of secondary cells 160. The first group or the second group of secondary cells may include one or more secondary cells, the number of the secondary cells of the first group or the second group subject to the configuration of the carrier aggregation.

Conventionally, when the terminal device 120 finds that the quality of current primary component cell 130 is not good enough due to various reasons, for example the primary cell radio quality is deteriorating, or the radio quality of other cell or carrier is becoming better by measuring all the neighboring cell or carriers, the terminal device 120 sends a report to the BS 110. Upon receipt of the report from the terminal device 120, the terminal device 110 determines a target or second primary cell 150 for the terminal device 120 as well as a second group of secondary cells 160. In embodiments of the present disclosure, the determining of the second primary cell 150 and/or the second group of secondary cells 160 may be implemented in a variety of ways, which is conventional and thus is not detailed herein.

The second primary cell 150 can be provided by another BS 111 as shown in FIG. 1 or provided by BS 110 which provides the first primary cell 130 as well.

Conventionally, the BS 110 sends a message indicating a primary cell change to the terminal device 120 and instructing the terminal device 120 to perform the primary cell change. During the process, a handover procedure is needed which means RRCConnectionReconfiguration message including MobiltyControlInfo is sent to the terminal device 120, which will then trigger PDCP/RLC reestablishment, MAC reset, new key derivation, and perform the random access procedure to the secondary primary cell 150. Usually this procedure will take relatively long time period for example 40 ms, and during this period, data transmission is delayed or interrupted.

In order to solve the above and other potential problems, embodiments of the present disclosure provides an efficient way to perform a primary cell change. In accordance with embodiments of the present disclosure, upon receipt of measurement report on quality of all neighboring cell and carriers including one or more of the first primary cell 140 and second primary cell 150 from the terminal device 120, the BS 110 determines a second primary cell 150 and a second group of secondary cells 160 and detects whether layer 2 context being kept and/or one or more serving secondary cells remain for a primary cell change for the terminal device 120 and configures a message indicating the primary cell change based on the detecting and then transmit the message to the terminal device 120. When entire of layer 2 context being kept, the BS 110 configures the message by including at least a security information element to require the terminal device 120 to derive a new security key and transmits the message to the terminal device 120. When part of the layer 2 context for example PDCP entity being kept, the BS 110 configures the message by including at least an information element to trigger reconfiguring of RLC/MAC entity and transmits the message to the terminal device 120. When entire of layer 2 context being kept and the index of the second primary cell 150 is not same as any secondary cell of the first group of secondary cells 140, the BS 110 configures the message by including at least ID information of the second group of secondary cells 160 and transmits the message to the terminal device 120. When the index of the second primary cell is same as one secondary cell of the first group of secondary cells, the BS 110 configures the message by including at least ID information of the second primary cell 150 and transmits the message to the terminal device 120.

In this way, by detecting the relationship between the first set of cells including the first primary cell 130 and the first group of secondary cells 140 and the second set of cells including the second primary cell 150 and the second group of secondary cells 160 and configuring the message of primary cell change accordingly, different means to perform the primary cell change may be performed among which primary cell change may complete without the handover procedure in some scenarios. As a result, it is possible to reduce the time period and optimize the data transmission during the period of primary cell change.

It is to be understood that the configuration of FIG. 1 is described merely for the purpose of illustration, without suggesting any limitation as to the scope of the present disclosure. Those skilled in the art will appreciate that the wireless communication network 100 may include any suitable number of terminal device and BS s and may have other suitable configurations, and each BS may provide any suitable number of carriers or cells.

Figure 2:
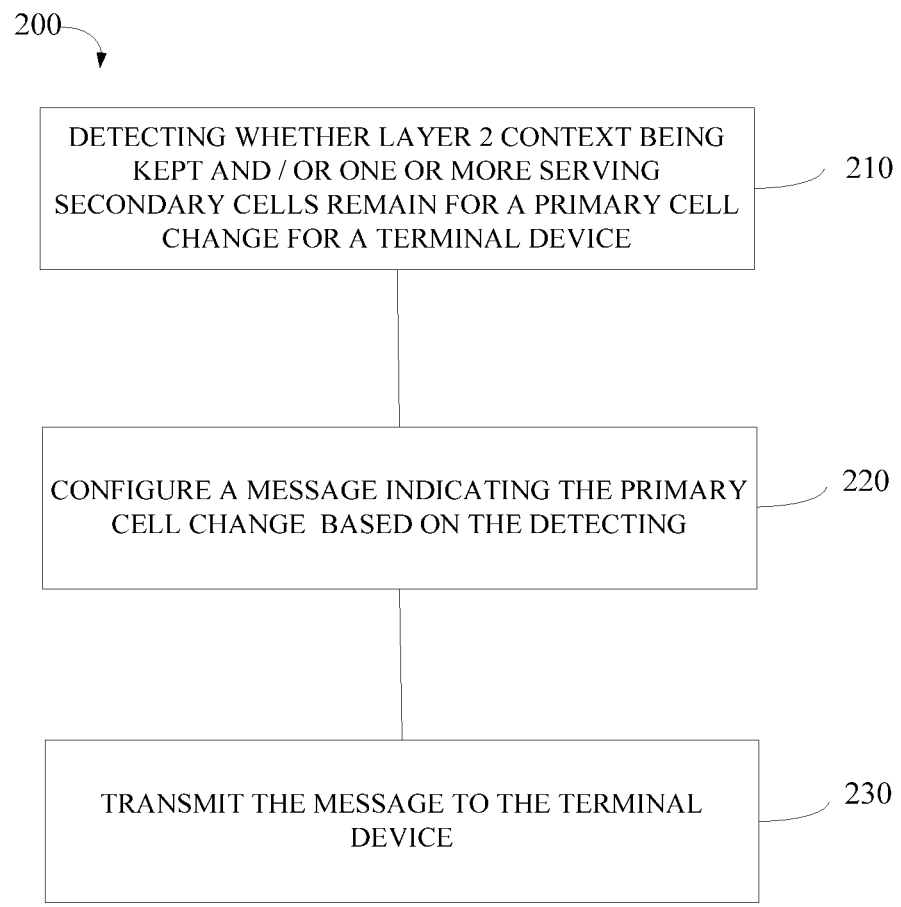
FIG. 2 shows a flowchart of a method 200 at a network device in accordance with an embodiment of the present disclosure.

Now reference is made to FIG. 2, which shows a flowchart of a method 200 for primary cell change implemented at a device in accordance with an embodiment of the present disclosure. With the method 200, the above and other potential deficiencies in the conventional approaches can be overcome. It would be appreciated by those skilled in the art that the method 200 may be implemented at a network device, such as the BS 110 or other suitable devices. For the purpose of illustration, the method 200 will be described below with reference to the BS 110 in the wireless communication system 100.

The method 200 is entered in block 201, where whether layer 2 context being kept and/or one or more serving secondary cells remain for a primary cell change for a terminal device is detected.

In embodiments of the present disclosure, the network device 110 detects whether layer 2 context being kept for a primary cell change for a terminal device 120. The layer 2 context refers to the entities, parameters or other information about the layer 2 for example the MAC HARQ state, RLC Tx/Rx status, which packets are received or not, PDCP TX/RX status, packet header compression state, and QoS state, UE priority and etc. Layer 2 context is common to a set of cells including a primary cell and a group of secondary cells which together serve the terminal device 120. Layer 2 context corresponding to the first primary cell 130 or the second primary cell 150 refer to the layer 2 context common to a set of cells serving the terminal device 120 including the first primary cell 130 and the first group of secondary cells 140 or the second primary cell 150 and the second group of secondary cells 160. When the layer 2 context corresponding to the first primary cell 130 and the first group of secondary cells 140 is different from the layer 2 context corresponding to the second primary cell 150 and the second group of secondary cells 160 depends on the eNB logical architecture. In one embodiment, all protocol entities are implemented in one logical node, then the entire L2 context may change when the logical node changes. In another embodiment, PDCP can be implemented in one logical node, while RLC/MAC can be implemented in another logical node, and then only part of the L2 context can be changed. Layer 2 context being kept may include part or entire of the layer 2 context keep the same. Layer 2 context being kept for a primary cell change for a terminal device may include part or entire of the layer 2 context corresponding to a first set of first primary cell 130 and the first group of secondary cell 140 keeps the same or not comparing to the one corresponding to the second set of cells of the second primary cell 150 and the second group of secondary cell 160. That is to say, to detect whether layer 2 context changes or not after the primary cell change. In still another embodiment, part of layer 2 context being kept may include the context for MAC and RLC changes while the context for PDCP for example PDCP entity remains the same or unchanged which may happen when the eNB architecture is split into different logical nodes where PDCP is within one logical node while RLC/MAC is within another logical node and thus it is possible that the entity of RLC/MAC may change while PDCP entity does not change.

In embodiments of the present disclosure, that the network device 110 detects whether one or more serving secondary cells remain for a primary cell change for a terminal device may include at least one secondary cells of the first set of cells remain the same as any cells of the second set of cells. That is to say, one or more of the secondary cells serving the terminal device 120 remain in the second set of cells to serve the terminal device 120. Observing from the terminal device side, the secondary cell(s) is serving and continues to serve the terminal device 120 before and after the primary cell change. The network device 110 detects whether one or more serving secondary cells remain for a primary cell change for a terminal device in a variety of ways. In an embodiment, the network device 110 detects whether the index (indices) of any secondary cells of the first set of cells is the same of any cells of the second set of cells. The serving secondary cell(s) 140 to remain in the second set of cells could be secondary cell(s) 160 or act as the second primary cell 150 after the primary cell change completes.

In embodiments of the present disclosure, the network device 110 detects layer 2 context being kept and one or more serving secondary cells remain for a primary cell change for the terminal device 120. The network device 110 may first detects whether layer 2 context being kept for a primary cell change for the terminal device 120 and then detects whether one or more serving secondary cells remain for a primary cell change for the terminal device 120. Optionally, the network device 110 may first detects whether one or more serving secondary cells remain for a primary cell change for the terminal device 120 and then detects whether layer 2 context being kept for a primary cell change for the terminal device 120.

In block 220, the network device 110 configures a message of primary cell change based on the detecting. In some embodiments, when it is detected that entire of layer 2 context not being kept or all of the layer 2 context changes, the network device 110 configure the message by including at least a security information element to require the terminal device 120 to derive a new security key, in this scenario, the other information or parameters necessary for performing primary cell change is also included in the message, for example, the ID information of the second primary cell 150 and the second group of secondary cells 160, the configuration for the second primary cell 150, the new physical layer parameter setting, the new MAC/RLC/PDCP setting, the new DRB setting etc. When it is detected that entire of layer 2 context except PDCP entity corresponding to the second primary cell 150 not being kept comparing to the first primary cell 130, the network device 110 configures the message by including at least an information element to trigger reconfiguring of RLC/MAC entity, that is to say, when it's detected that only PDCP entity does not change while all the other layer 2 context changes such as the MAC or RLC, the network device 110 configures the message by including at least an information element to trigger reconfiguring of RLC/MAC entity, the security information element to require the terminal device 120 to derive a new security key is thus not included in the message, in this scenario, the other information or parameters necessary for performing primary cell change is also included in the message, for example, the ID information of the secondary primary cell 150 and the second group of secondary cells 160, the configuration for the second primary cell 150, the new physical layer parameter setting, the new MAC/RLC setting and etc. When it is detected that entire of layer 2 context being kept and the index of the second primary cell is not same as any secondary cell of the first group of secondary cells 140, the network device 110 configures the message by including at least ID information of the second primary cell 150 and second group of secondary cells 160, in this scenario, the other information or parameters necessary for performing primary cell change is also included in the message, for example, new physical layer parameter setting and the configuration for the second primary cell 150.

When it is detected that the index of the second primary cell 130 is same as one secondary cell of the first group of secondary cells 140, the terminal device 110 configure the message by including at least ID information of the second primary cell 150, in this scenario, the other information or parameters necessary for performing primary cell change is also included in the message, such as the ID information of the second group of secondary cells 160, in this scenario, the configuration for the second primary cell 150 may not be included in the message. In some of the embodiments illustrated above, based on the configured message, the process of handover procedure is not needed and thus may reduce the time period and optimize the data transmission during the process of primary cell change.

In some embodiments, the message can be a MAC message or Radio Resource Control (RRC) message such as an RRC Connection Reconfiguration message, or any other suitable message. The MAC message may include a MAC control element which is identified by a Logical Channel ID. Alternatively, the MAC message may include a MAC control element which indicates index of the second primary cell 150. In an embodiment, when it is detected that the index of the second primary cell is same as one secondary cell of the first group of secondary cells, the message may be configured via a MAC message and RRC procedure may be used for the other scenarios. For the scenario using the MAC message, a new MAC CE (control element) is defined which is used to notify the terminal device 120 the index of the second primary cell 150. The new MAC CE is identified by a Logical Channel ID.

In block 230, the network device 110 transmits the configured message to the terminal device 120 indicating the primary cell change and instructing the terminal device 120 to perform the primary cell change. In some embodiments, the message is transmitted via all existing component cells controlled by the network device 110 which continues transmitting the MAC control element until receiving a HARQ ACK from one of the component cells corresponding to this MAC control element transmission.

Figure 3:
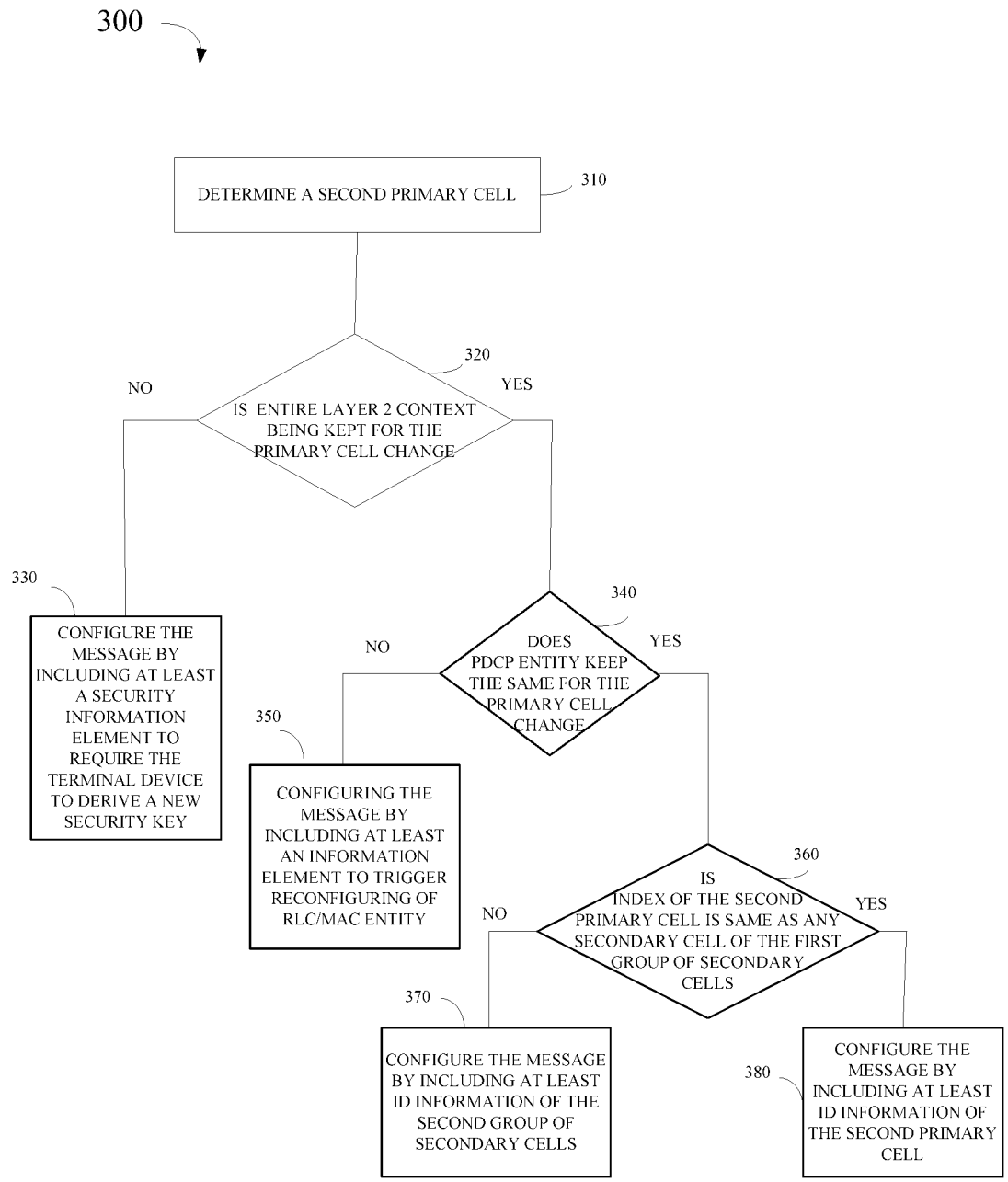
FIG. 3 shows a flowchart of a method 300 at a network device in accordance with an embodiment of the present disclosure.

Now some example embodiments will be described with respect to FIG. 3. FIG. 3 shows a flowchart of a method 300 for primary cell change implemented at a network device in accordance with an embodiment of the present disclosure. The method 300 may be considered as a specific implementation of the method 200 described above with reference to FIG. 3. However, it is noted that this is only for the purpose of illustrating the principles of the present disclosure, rather than limiting the scope thereof.

The method 300 is entered in block 310, where the BS 110 determines the second primary cell 150 for the terminal device 120.

In block 320, the network device 110 detects whether entire of layer 2 context being kept for the primary cell change, when it's detected that the entire of layer 2 context not being kept, the network device 110 configures the message by including at least a security information element to require the terminal device 120 to derive a new security key. When it's detected that the not entire or all of layer 2 context changes for the primary cell change, the method 300 proceeds to block 340, where the network device 110 detects whether PDCP entity keeps the same for the primary cell change, when it's detected that PDCP entity keep the same for the primary cell change but MAC/RLC entity changes, the network device 110 configures the message by including at least an information element to trigger reconfiguring of RLC/MAC entity. When it's detected that entire layer 2 context keeps the same for the primary cell change, the method 300 proceeds to block 360, where the network device 110 detects whether the index of the second primary cell 150 is same as one secondary cell of the first group of secondary cells 140. When it's detected that the index of the second primary cell 150 is not same as one secondary cell of the first group of secondary cells 140, the network device 110 configures the message by including at least ID information of the second group of secondary cells 160. When it's detected that the index of the second primary cell 150 is same as one secondary cell of the first group of secondary cells 140, the network device 110 configures the message by including at least ID information of the second primary cell 150.

In this way, various scenarios based on the detected relationship between the first set of cells and the second set of cells can be treated differently. This helps to reduce the time period of performing the primary cell change and optimize the data transmission during the process.

FIG. 4 shows a flowchart of a method 400 for primary cell change implemented at a terminal device in accordance with an embodiment of the present disclosure. With the method 400, the above and other potential deficiencies in the conventional approaches can be overcome. It would be appreciated that the method 400 may be implemented by a device, such as the terminal device 120 or other suitable devices. For the purpose of illustration, the method 400 will be described below with reference to the terminal device 120 in the wireless communication system 100.

The method 400 is entered in block 410, where a message of primary cell change is received from a network device. The message is configured by the network device, for example, the BS 110, based on detecting the first set of cells and the second set of cells. The configuration of the message may be implemented according to the method 200 or the method 300 as discussed above, and thus the details are not repeated here.

In block 420, where the terminal device 120 detects the information of primary cell change from the received message transmitted from the network device 110. In some embodiments of present disclosure, the message may include an information element for derivation of a new security key, an information element to trigger reconfiguring of RLC/MAC, ID information of the second group of secondary cells, ID information of the second primary cell, configuration for the second primary cell, the new physical layer parameter setting, the new MAC/RLC/PDCP setting, the new DRB setting and other information necessary for the primary cell change.

In block 430, when it is detected that the received message includes an information element for derivation of a new security key, the terminal device 120 derives a new security key, updates the second primary cell index according to the received message, resets MAC; re-establishes PDCP/RLC; and initiates random access to the second primary cell to get sync with the second primary cell 150. In this scenario, a standard handover procedure is followed and the details are omitted herein for simplicity of the discussion. The security key corresponds to a layer 2 context, when entire of the layer 2 context changes, the security key may change and a new security key may be needed, when part or entire of the layer 2 context keeps the same, the security key may keep the same, for example, if PDCP does not change while MAC and RLC change, there is no need to generate a new security key at the terminal device 120 to perform the primary cell change.

When it is detected that the received message includes an information element to trigger reconfiguring of RLC/MAC, but no information element for derivation of a new security key, the terminal device 120 updates the second primary cell index according to the received message; resets MAC; re-establishes RLC; and initiates random access to get sync with the second primary cell 150. In this scenario, there is no need to derive a new security key, thus the time period to perform the primary cell change may be reduced.

When it is detected that the received message does not include an information element for derivation of a new security key or an information element for triggering reconfiguring of RLC/MAC while the index of any of the second set of cells including second primary cell 150 and secondary cells in the second group of secondary cells 160 included in the message is not the same as the index of first set of cells including the first primary cell 130 and secondary cells in the first group of secondary cells 140, the terminal device 120 updates the second primary cell index according to the received message and initiates random access to the second primary cell 150. In an embodiment, the terminal device 120 first detects whether the received message includes an information element for derivation of a new security key, if no, then detects whether the received message includes an information element for triggering reconfiguring of RLC/MAC, if no, then detects whether the index of any of the second primary cell 150 and secondary cells in the second group of secondary cells 160 included in the message is the same as the first primary cell 130 and secondary cells in the first group of secondary cells 140; in another embodiment, the terminal device 120 first detects whether the received message includes an information element for triggering reconfiguring of RLC/MAC, if no, then detects whether the received message includes an information element for derivation of a new security key, if no, then detects whether the index of any of the second primary cell 150 and secondary cells in the second group of secondary cells 160 included in the message is the same as the first primary cell 130 and secondary cells in the first group of secondary cells 140; in another embodiment, the terminal device 120 first detects whether the index of any of the second primary cell 150 and secondary cells in the second group of secondary cells 160 included in the message is the same as the first primary cell 130 and secondary cells in the first group of secondary cells 140, if no, then detects whether the received message includes an information element for derivation of a new security key, if no, then detects whether the received message includes an information element for triggering reconfiguring of RLC/MAC; in still another embodiment, the terminal device 120 first detects whether the index of any of the second primary cell 150 and secondary cells in the second group of secondary cells 160 included in the message is the same as the first primary cell 130 and secondary cells in the first group of secondary cells 140, if no, then detects whether the received message includes an information element for triggering reconfiguring of RLC/MAC; then detects whether the received message includes an information element for derivation of a new security key. In this scenario, there is no need to reset MAC, re-establish RLC or derive a new security key at the terminal device 120, thus the time period to perform the primary cell change may be reduced substantially.

When it is detected that the index (indices) of one or more of the second primary cell 150 and secondary cells in the second group of secondary cells 160 included in the message is the same as the first primary cell 130 and secondary cells in the first group of secondary cells 140 while the index of the second primary cell 150 is not same as index of any one of the secondary cells in the first group of secondary cells 140, the terminal device 120 updates the second primary cell index according to the received message, initiates random access to get sync with the second primary cell 150, while the data transmission and or reception on the one or more secondary cells of the first group of secondary cells 140 whose index (indices) is the same as any one secondary cell of the second group of secondary cells 160 between the terminal device 120 and the network device 110 continues during the primary cell change. In this scenario, there is no need to reset MAC, re-establish RLC and derive a new security key at the terminal device 120 during the primary cell change, and meanwhile, since one or more of the secondary cells remain or maintain before and after the primary cell change, hence, the data transmission and or reception between the terminal device 120 and the network device 110 can be maintained via the one or more of the secondary cells, thus the time period to perform the primary cell change may be reduced and the data transmission and or reception between the terminal device 120 and the network device 110 would not be delayed or interrupted and the user experience could be improved considerably.

When it is detected that the index of the second primary cell 150 is same as index of any one of the secondary cells in the first group of secondary cells 140, the terminal device 120 updates the second primary cell index according to the received message, and the data transmission and or reception on the one or more secondary cells of the first group of secondary cells 140 whose index is the same as any one of the secondary primary cell 150 and secondary cell of the second group of secondary cells 160 between the terminal device 120 and the network device 110 can be maintained. In this scenario, there is no need to reset MAC, re-establish RLC, derive a new security key, initiate random access to get sync with the second primary cell 150 at the terminal device 120 during the primary cell change, and meanwhile, since one or more of the secondary cells remain or maintain before and after the primary cell change, hence, the data transmission and or reception between the terminal device 120 and the network device 110 can be maintained via the one or more of the secondary cells, thus the time period to perform the primary cell change may be reduced considerably and the data transmission and or reception between the terminal device and the network device would not be interrupted and the user experience could be improved greatly.

Figure 5:
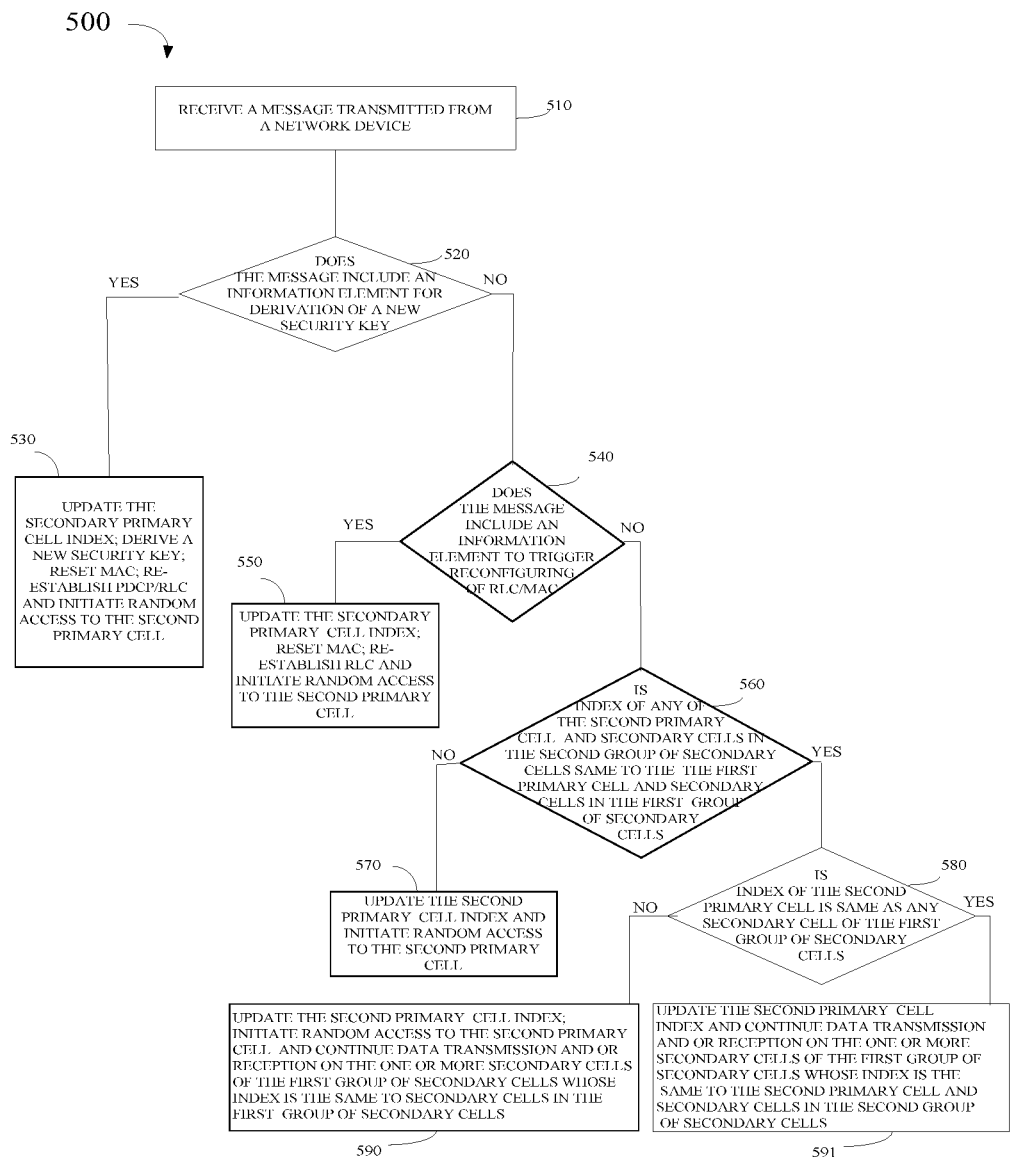
FIG. 5 shows a flowchart of a method 500 at a terminal device in accordance with an embodiment of the present disclosure.

Now some example embodiments will be described with respect to FIG. 5. FIG. 5 shows a flowchart of a method 500 for primary cell change implemented at a terminal device in accordance with an embodiment of the present disclosure. The method 500 may be considered as a specific implementation of the method 400 described above with reference to FIG. 4. However, it is noted that this is only for the purpose of illustrating the principles of the present disclosure, rather than limiting the scope thereof.

The method 500 is entered in block 510, where the terminal device 120 receives a message transmitted from the network device 110. The message includes information indicating a primary cell change.

In block 520, the terminal device 120 detects whether the received message includes an information element for derivation of a new security key, when it's detected that the received message includes an information element for derivation of a new security key, the terminal device 120 performs a standard handover procedure for the primary cell change. When it's detected that the received message does not include an information element for derivation of a new security key, the method 500 proceeds to block 540, where the terminal device 120 detects whether the received message include the information element to trigger reconfiguring of RLC/MAC, when it's detected that the received message includes an information element to trigger reconfiguring of RLC/MAC, the terminal device 120 updates the second primary cell index according to the received message, resets MAC, re-establishes RLC and initiates random access to get synch with the second primary cell 150. When it's detected that the received message does not include an information element to trigger reconfiguring of RLC/MAC, the method 500 proceeds to block 560, where the terminal device 120 detects whether index (indices) of any of the second primary cell 150 and secondary cells in the second group of secondary cells 160 included in the message is the same as the first primary cell 130 and secondary cells in the first group of secondary cells 140. When it's detected that index (indices) of any of the second primary cell 150 and secondary cells in the second group of secondary cells 160 included in the message is not the same as the first primary cell 130 and secondary cells in the first group of secondary cells 140, the terminal device 120 updates the second primary cell index according to the received message and initiates random access to get sync with the second primary cell 150. When it's detected that index (indices) of any of the second primary cell 150 and secondary cells in the second group of secondary cells 160 included in the message is the same as the first primary cell 130 and secondary cells in the first group of secondary cells 140, the method 500 proceeds to block 580, where the terminal device 120 detects whether index of the second primary cell 150 is same as any one of the secondary cells in the first group of secondary cells 140. When it's detected that index of the second primary cell 150 is not same as any one of the secondary cells in the first group of secondary cells 140, the terminal device 120 updates the second primary cell index according to the received message, initiates random access to get sync with the second primary cell 150 and the data transmission and or reception on the one or more secondary cells of the first group of secondary cells 140 whose index is the same as any one secondary cell of the second group of secondary cells 160 between the terminal device 120 and the network device 110 continues. When it's detected that index of the second primary cell 150 is same as any one of the secondary cells in the first group of secondary cells 140, the terminal device 120 updates the second primary cell index according to the received message and the data transmission and or reception on the one or more secondary cells of the first group of secondary cells 140 whose index is the same as any one of the second primary cell 150 and secondary cell of the second group of secondary cells 160 between the terminal device 120 and the network device 110 continues.

In this way, various scenarios based on the detected relationship between the first set of cells and the second cells can be treated differently. This helps to reduce the time period of performing the primary cell change and optimize the data transmission during the process.

Figure 6:
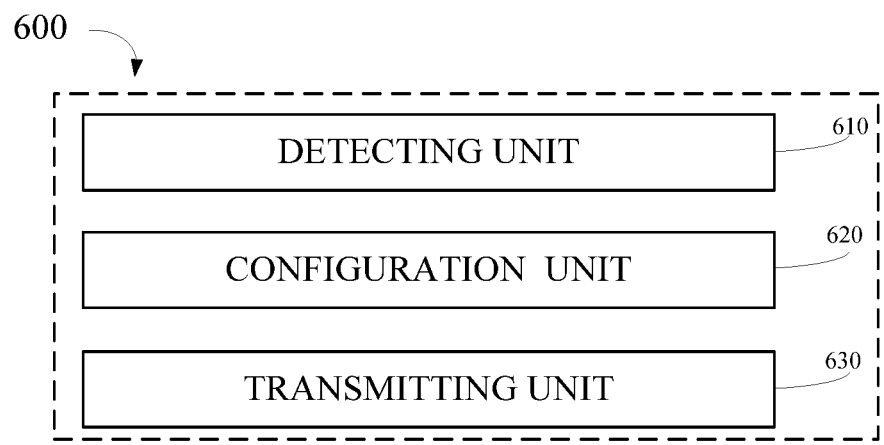
FIG. 6 shows a block diagram of a network device 600 in accordance with an embodiment of the present disclosure.

Now reference is made to FIG. 6 shows a block diagram of a device 600 in accordance with an embodiment of the present disclosure. It would be appreciated that the device 600 may be implemented at a network device, such as the BS 110 as shown in FIG. 1, a server, a controller or other suitable devices.

As shown, the network device 600 includes a detecting unit 610, a configuration unit 620 and a transmitting unit 630. The detecting unit 610 is configured to detect whether layer 2 context being kept and/or one or more serving secondary cells remain for a primary cell change for a terminal device, the configuration unit 620 is configured to configure a message indicating a primary cell change based on the detecting by the detecting unit 610, the transmitting unit 630 is configured to transmit the message to the terminal device 120.

In an embodiment, the configuration unit 620 is further configured to, in response to it being detected that entire of the layer 2 context not being kept, configure the message by including at least an information element to require the terminal device 120 to derive a new security key.

In an embodiment, the configuration unit 620 is further configured to, in response to it being detected that entire of the layer 2 context except PDCP entity corresponding to the second primary cell 150 not being kept comparing to the first primary cell 130, configure the message by including at least an information element to trigger reconfiguring of RLC/MAC entity.

In an embodiment, the configuration unit 620 is further configured to, in response to it being detected that entire of layer 2 context being kept while the index of the second primary cell 150 is not same as any secondary cell of the first group of secondary cells 140, configure the message by including at least ID information of the second group of secondary cells 160.

In an embodiment, the configuration unit 620 is further configured to, in response to it being detected that the index of the second primary cell 150 is same as one secondary cell of the first group of secondary cells 140, configure the message by including at least ID information of the second primary cell 150.

Figure 7:
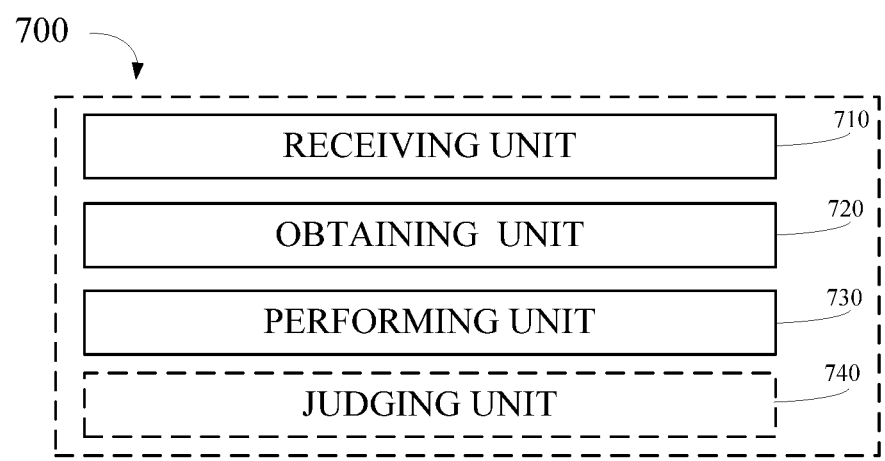
FIG. 7 shows a block diagram of a terminal device 700 in accordance with an embodiment of the present disclosure.

Now reference is made to FIG. 7 which shows a block diagram of an apparatus 700 implemented at a terminal device in accordance with an embodiment of the present disclosure. It would be appreciated that the apparatus 700 may be implemented at a terminal device or other suitable devices.

As shown, the apparatus 700 includes a receiving unit 710, an obtaining unit 720, and a performing unit 730. The receiving unit 710 is configured to receive a message transmitted from a network device, the message being configured by detecting whether layer 2 context being kept and/or one or more serving secondary cells remain for a primary cell change for the terminal device 120, the obtaining unit 720 is configured to obtain information of the primary cell change from the received message, the performing unit 730 is configured to perform the primary cell change based on the information.

In an embodiment, the terminal device 120 may further include a judging unit 740, the judging unit 740 is configured to judge whether the received message includes an information element for derivation of a new security key; or judge whether the received message includes an information element to trigger reconfiguring of RLC/MAC; or judge whether the index (indices) of any one of the second primary cell 150 and the second group of secondary cells 160 included in the message is the same as the first primary cell 130 and the first of group secondary cells 140; or judge whether the index of the second primary cell 150 included in the message is same as index of any one of the first group of secondary cells 140.

In an embodiment, the performing unit 730 is further configured to, in response to it being detected that the received message includes the information element for derivation of a new security key, derive a second security key, reset MAC, re-establish PDCP/RLC and initiate random access to get sync with the second primary cell 150.

In an embodiment, the performing unit 730 is further configured to, in response to it being detected that the received message includes an information element to trigger reconfiguring of RLC/MAC but not an information element for derivation of a new security key, update the second primary cell index according to the received message, reset MAC, re-establish RLC and initiate random access to get sync with the second primary cell 150.

In an embodiment, the performing unit 730 is further configured to, in response to the received message does not include an information element for derivation of a new security key or trigger reconfiguring of RLC/MAC while the index (indices) of any of the second primary cell 150 and the second group of secondary cells 160 included in the message is not the same as the first primary cell 130 and the first group of secondary cells 140, update the second primary cell index according to the received message and initiate random access to get sync with the second primary cell 150.

In an embodiment, the performing unit 730 is further configured to, in response to it being detected that the received message does not include an information element for derivation of a new security key or trigger reconfiguring of RLC/MAC while the index (indices) of one or more of the second primary cell 150 and secondary cells in the second group of secondary cells 160 included in the message is the same as the first primary cell 130 and secondary cells in the first group of secondary cells 140 while the index of the second primary cell 150 is not same as index of any one of the secondary cells in the first group of secondary cells 140, update the second primary cell index according to the received message, initiate random access to get sync with the second primary cell 150 and continue data transmission and or reception on the one or more secondary cells of the first group of secondary cells 140 whose index (indices) is the same as any one secondary cell of the second group of secondary cells 160 between the terminal device 120 and the network device 110.

In an embodiment, the performing unit 730 is further configured to, in response to it being detected that the received message does not include an information element for derivation of a new security key or trigger reconfiguring of RLC/MAC while the index of the second primary cell 150 is same as index of any one of the first group of secondary cells 140, update the second primary cell index according to the received message and continue data transmission and or reception on the one or more secondary cells of the first group of secondary cells 140 whose index (indices) is the same as any one of the first primary cell 150 and secondary cell of the second group of secondary cells 160 between the terminal device 120 and the network device 110.

It should be appreciated that components included in the apparatus 600 correspond to the operations of the methods 200 and 300, and components included in the apparatus 700 correspond to the operations of the methods 400 and 500. Therefore, all operations and features described above with reference to FIGS. 2 and 3 are likewise applicable to the components included in the apparatus 600 and have similar effects, and all operations and features described above with reference to FIGS. 4 and 5 are likewise applicable to the components included in the apparatus 700 and have similar effects. For the purpose of simplification, the details will be omitted.

The components included in the apparatuses 600 and 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatuses 600 and 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for detecting whether layer 2 context being kept and/or one or more serving secondary cells remain for a primary cell change for a terminal device; means for configuring a message indicating a primary cell change based on the detecting; and means for transmitting the message to the terminal device.

In an embodiment, the means for configuring a message indicating a primary cell change based on the detecting may include: means for, in response to it being detected that entire of the layer 2 context not being kept, configuring the message by including at least security information element to require the terminal device to derive a new security key.

In an embodiment, the means for configuring a message indicating a change of primary cell based on the detecting may include: means for, in response to it being detected that entire of the layer 2 context except PDCP entity corresponding to the second primary cell not being kept comparing to the first primary cell, configuring the message by including at least information element to trigger reconfiguring of RLC/MAC entity.

In an embodiment, the means for configuring a message indicating a primary cell change based on the detecting may include: means for, in response to it being detected that entire of layer 2 context being kept while the index of the second primary cell is not same as any secondary cell of the first group of secondary cells, configuring the message by including at least ID information of the second group of secondary cells.

In an embodiment, the means for configuring a message indicating a primary cell change based on the detecting may include: means for, in response to it being detected that the index of the second primary cell is same as one secondary cell of the first group of secondary cells, configuring the message to include at least ID information of the second primary cell.

In accordance with embodiments of the present disclosure, there is provided an apparatus implemented at a terminal device. The apparatus includes: means for receiving a message transmitted from a network device, the message being configured by detecting whether layer 2 context being kept and/or one or more serving secondary cells remain for a primary cell change for the terminal device, means for obtaining information of the primary cell change from the received message; and means for performing the primary cell change based on the information.

In an embodiment, the terminal device further includes means for judging whether the received message includes an information element for derivation of a new security key; or judging whether the received message includes an information element to trigger reconfiguring of RLC/MAC; or judging whether the index (indices) of any of the second primary cell and the second group secondary cells included in the message is not the same as the first primary cell and the second group secondary cells; or judging whether the index of the second primary cell included in the message is same as index of any one of the first group of secondary cells.

In an embodiment, the means for performing the primary cell change based on the information includes means for, in response to it being detected that the received message includes the information element for derivation of a new security key, deriving a second security key, resetting MAC, re-establishing PDCP/RLC and initiating random access to the second primary cell.

In an embodiment, the means for performing the primary cell change based on the information includes means for, in response to it being detected that the received message includes an information element to trigger reconfiguring of RLC/MAC, updating the second primary cell index according to the received message, resetting MAC, re-establishing RLC and initiating random access to the second primary cell.

In an embodiment, the means for performing the primary cell change based on the information includes means for, in response to the received message does not include an information element for derivation of a new security key or trigger reconfiguring of RLC/MAC while the index (indices) of any of the second primary cell and the second group secondary cells included in the message is not the same as the first primary cell and the second group secondary cells, updating the second primary cell index according to the received message and initiating random access to the second primary cell.

In an embodiment, the means for performing the primary cell change based on the information includes means for, in response to it being detected that the index (indices) of one or more of the second primary cell and secondary cells in the second group of secondary cells included in the message are the same as the first primary cell and secondary cells in the first group of secondary cells while the index of the second primary cell is not same as index of any one of the secondary cells in the first group of secondary cells, updating the second primary cell index according to the received message, initiating random access to the second primary cell and continuing data transmission and or reception on the one or more secondary cells of the first group of secondary cells whose index (indices) is the same as any one secondary cell of the second group of secondary cells between the terminal device and the network device.

In an embodiment, the means for performing the primary cell change based on the information includes means for, in response to it being detected that the index of the second primary cell is same as index of any one of the first group of secondary cells, updating the second primary cell index according to the received message and continuing data transmission and or reception on the one or more secondary cells of the first group of secondary cells whose index (indices) is the same as any one of the second primary cell and secondary cell of the second group of secondary cells between the terminal device and the network device.

Figure 8:
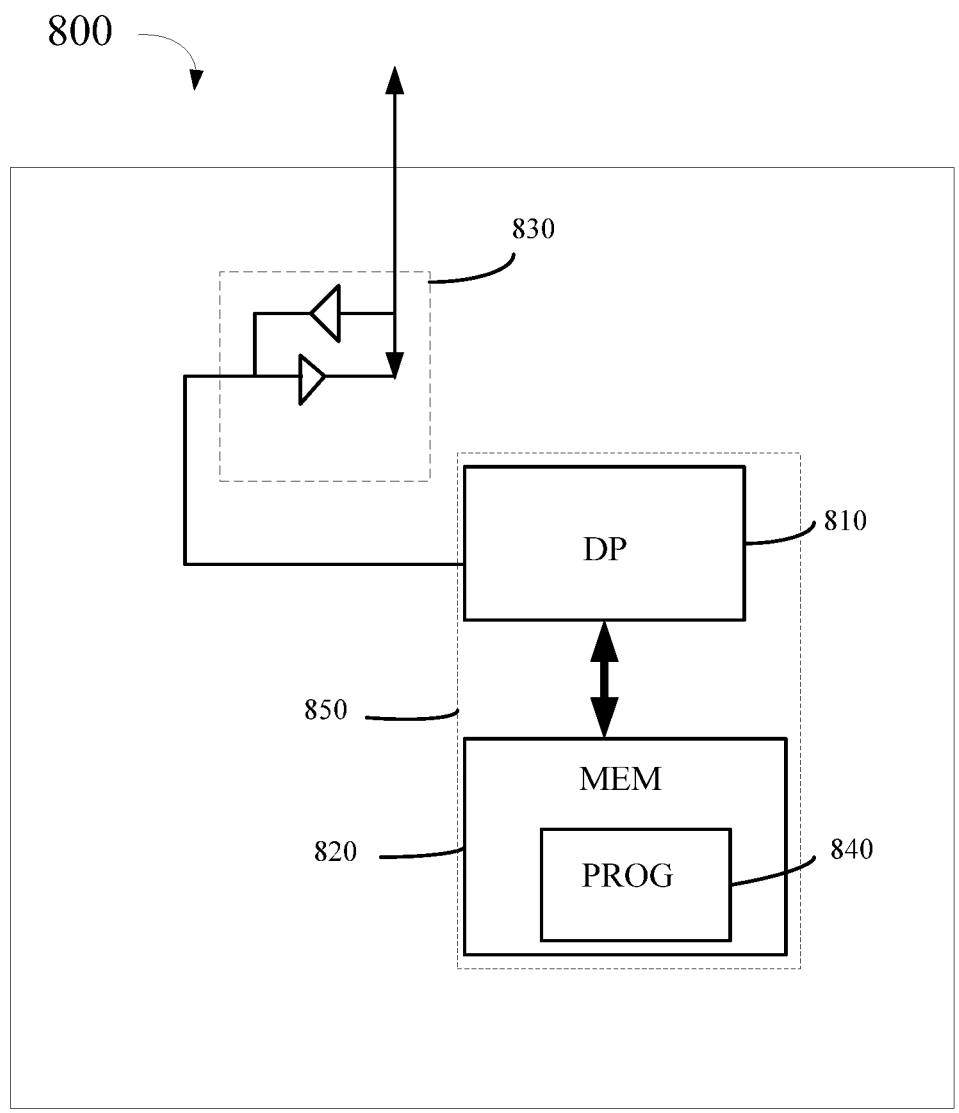
FIG. 8 shows a simplified block diagram 800 of a device that is suitable for use in implementing embodiments of the present disclosure.

FIG. 8 shows a simplified block diagram of a device 800 that is suitable for implementing embodiments of the present disclosure. It would be appreciated that the device 800 may be implemented as at least a part of, for example, the network device 110 or the terminal device 120.

As shown, the device 800 includes a communicating means 830 and a processing means 850. The processing means 850 includes a data processor (DP) 810, a memory (MEM) 820 coupled to the DP 810. The communicating means 830 is coupled to the DP 810 in the processing means 850. The MEM 820 stores a program (PROG) 840. The communicating means 830 is for communications with other devices, which may be implemented as a transceiver for transmitting/receiving signals.

In some embodiments where the device 800 acts as a network device, the processing means 850 may be configured to configure a message indicating a primary cell change based on the detecting by the detecting unit; and the communicating means 930 may be configured to transmit the message indicating a primary cell change. In some other embodiments where the device 800 acts as a terminal device, the processing means 850 may be configured to detect information of the primary cell change, and the communicating means 830 may be configured to receive a message indicating a primary cell change.

The PROG 840 is assumed to include program instructions that, when executed by the associated DP 810, enable the device 800 to operate in accordance with the embodiments of the present disclosure, as discussed herein with the method 200, 300 or 400. The embodiments herein may be implemented by computer software executable by the DP 810 of the device 800, or by hardware, or by a combination of software and hardware. A combination of the data processor 810 and MEM 820 may form processing means 850 adapted to implement various embodiments of the present disclosure.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 800, there may be several physically distinct memory modules in the device 800. The DP 810 may be of any type suitable to the local technical environment, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, comprising:
   receiving a message transmitted from a network device, the message being configured by detecting, for a primary cell change for the terminal device, at least one of whether layer 2 context is being kept and one or more serving secondary cells in a first group of secondary cells remain, wherein detecting the one or more serving secondary cells remaining for the primary cell change for the terminal device is to determine: an index of a second primary cell is same as an index of one secondary cell of the first group of secondary cells, or an index of one or more of the second primary cell and secondary cells in a second group of secondary cells included in the message is the same as an index of one or more of a first primary cell and one or more serving secondary cells in the first group of secondary cells; obtaining information of the primary cell change from the received message; and performing the primary cell change based on the information.

2. The method according to claim 1, wherein detecting whether the layer 2 context is being kept for the primary cell change for the terminal device is detecting whether a part or entirety of the layer 2 context corresponding to the second primary cell keeps the same comparing to a part or entirety of the layer 2 context corresponding to the first primary cell; and the terminal device is being served by the first primary cell and the first group of secondary cells, and the terminal device to be served by the second primary cell and the second group of secondary cells after the primary cell change.

3. The method according to claim 2, further comprising:
   in response to a detection that the received message includes an information element for derivation of a new security key,
      updating a second primary cell index according to the received message;
      deriving the new security key;
      resetting medium access control (MAC);
      re-establishing packet data convergence protocol/radio link control (PDCP/RLC); and
      initiating random access to the second primary cell.

4. The method according to claim 2, further comprising:
   in response to a detection that the received message includes an information element to trigger reconfiguring of radio link control/medium access control (RLC/MAC),
      updating a second primary cell index according to the received message;
      resetting medium access control (MAC);
      re-establishing radio link control (RLC); and
      initiating random access to the second primary cell.

5. The method according to claim 2, further comprising:
   in response to a detection that the received message does not include an information element for derivation of a new security key or triggering reconfiguring of radio link control/medium access control (RLC/MAC) while an index of any of the second primary cell and secondary cells in the second group of secondary cells included in the message is not the same as an index of one of the first primary cell and secondary cells in the first group of secondary cells,
updating a second primary cell index according to the received message; and
initiating random access to the second primary cell.

6. The method according to claim 2, further comprising;
in response to the index of one or more of the second primary cell and secondary cells in the second group of secondary cells included in the message is the same as the index of the first primary cell and secondary cells in the first group of secondary cells while the index of the second primary cell is not same as the index of any one of the secondary cells in the first group of secondary cells,
updating a second primary cell index according to the received message;
initiating random access to the second primary cell; and
continuing data transmission and/or reception on the one or more secondary cells of the first group of secondary cells whose index is the same as any one secondary cell of the second group of secondary cells between the terminal device and the network device.

7. The method according to claim 2, further comprising;
in response to a detection that an index of the second primary cell is same as an index of any one of the secondary cells in the first group of secondary cells,
updating a second primary cell index according to the received message; and
continuing data transmission and/or reception on the one or more secondary cells of the first group of secondary cells whose index is the same as any one of the second primary cell and secondary cell of the second group of secondary cells between the terminal device and the network device.

8. A terminal device, comprising:
a non-transitory machine-readable storage medium to store instructions; and
a data processor coupled with the non-transitory machine-readable storage medium to process the stored instructions to: receive a message transmitted from a network device, the message being configured by detecting, for a primary cell change for the terminal device, at least one of whether layer 2 context is being kept and one or more serving secondary cells in a first group of secondary cells remain, wherein detection of the one or more serving secondary cells remaining for the primary cell change for the terminal device is to determine: an index of a second primary cell is same as an index of one secondary cell of the first group of secondary cells, or an index of one or more of the second primary cell and secondary cells in a second group of secondary cells included in the message is the same as an index of one or more of a first primary cell and one or more serving secondary cells in the first group of secondary cells, obtain information of the primary cell change from the received message, and perform the primary cell change based on the information.

9. The terminal device according to claim 8, wherein the detection of whether the layer 2 context is being kept for the primary cell change for the terminal device is detecting whether a part or entirety of the layer 2 context corresponding to the second primary cell keep the same comparing to a part or entirety of the layer 2 context corresponding to the first primary cell; and the terminal device is being served by the first primary cell and the first group of secondary cells, and the terminal device to be served by the second primary cell and the second group of secondary cells after the primary cell change.

10. The terminal device according to claim 9, the terminal device is further to:
judge whether the received message includes an information element for derivation of a new security key; or
judge whether the received message includes an information element to trigger reconfiguring of radio link control/medium access control (RLC/MAC); or
judge whether the index of any of the second primary cell and the second group of secondary cells included in the message is the same as the first primary cell and the second of group secondary cells; or
judge whether the index of the second primary cell included in the message is same as index of any one of the first group of secondary cells.

11. The terminal device according to claim 9, wherein the terminal device is further to:
in response to a detection that the received message includes an information element for derivation of a new security key, derive a second security key, reset medium access control (MAC), re-establish packet data convergence protocol/radio link control (PDCP/RLC) and initiate random access to the second primary cell.

12. The terminal device according to claim 9, wherein the terminal device is further to:
in response to a detection that the received message includes an information element to trigger reconfiguring of radio link control/medium access control (RLC/MAC), update a second primary cell index according to the received message, reset medium access control (MAC), re-establish radio link control (RLC) and initiate random access to the second primary cell.

13. The terminal device according to claim 9, wherein the terminal device is further to:
in response to the received message does not include an information element for derivation of a new security key or trigger reconfiguring of radio link control/medium access control (RLC/MAC) while the index of any of the second primary cell and the second group of secondary cells included in the message is not the same as the index of the first primary cell and the second group of secondary cells, update a second primary cell index according to the received message and initiate random access to the second primary cell.

14. The terminal device according to claim 9, wherein the terminal device is further to:
in response to a detection that the index of one or more of the second primary cell and secondary cells in the second group of secondary cells included in the message is the same as that the index of the first primary cell and secondary cells in the first group of secondary cells while the index of the second primary cell is not same as an index of any one of the secondary cells in the first group of secondary cells, update a second primary cell index according to the received message, initiate random access to the second primary cell and continue data transmission and/or reception on the one or more secondary cells of the first group of secondary cells whose index is the same as any one secondary cell of the second group of secondary cells between the terminal device and the network device.

15. The terminal device according to claim 9, wherein the terminal device is further to:
in response to a detection that the index of the second primary cell is same as an index of any one of the first group of secondary cells, update a second primary cell index according to the received message and continue data transmission and/or reception on the one or more secondary cells of the first group of secondary cells whose index is the same as the index of any one of the second primary cell and secondary cell of the second group of secondary cells between the terminal device and the network device.

\* \* \* \* \*